United States Patent [19]

Nixon

[11] 3,844,770

[45] Oct. 29, 1974

[54] MANUFACTURE OF STEEL AND FERROUS ALLOYS

[76] Inventor: Ivor Gray Nixon, 1st Stock Links, "Matterhorngruss", Zermatt, Valais, Switzerland

[22] Filed: May 9, 1973

[21] Appl. No.: 358,664

Related U.S. Application Data

[63] Continuation-in-part of Ser. No. 181,360, Sept. 17, 1971, abandoned.

[52] U.S. Cl. .................................. 75/60, 75/34
[51] Int. Cl. ............................................. C21c 5/28
[58] Field of Search .................. 75/60, 26, 34, 9

[56] References Cited
UNITED STATES PATENTS

| | | | |
|---|---|---|---|
| 2,894,831 | 7/1959 | Old | 75/9 |
| 3,140,168 | 7/1964 | Halley | 75/26 |
| 3,145,094 | 8/1964 | Nakajima | 75/26 |
| 3,456,928 | 7/1969 | Selway | 75/60 |
| 3,479,232 | 11/1969 | Broussard | 75/34 |
| 3,709,679 | 1/1973 | Draeger | 75/34 |

*Primary Examiner*—L. Dewayne Rutledge
*Assistant Examiner*—Peter D. Rosenberg
*Attorney, Agent, or Firm*—William R. Liberman, Esq.

[57] ABSTRACT

A converter for the manufacture of steel of ferrous alloys from raw iron feedstock is operated as a closed system and process gases are recovered by means of a gas conduit connected to the converter by a gas-tight joint. A quench stream is introduced to reduce the temperature of gases leaving the converter and preferably the gas-tight joint is directly cooled by means of a quench stream which reacts endothermically with gas generated in the converter. The recovered process gases can be used for the reduction of iron ore or as fuel gas. The ratio of oxidant (carbon dioxide and/or water vapour) to reducing gases (hydrogen and/or carbon monoxide) in the blow gas used in the converter is adjusted so that the gas mixture leaving the converter has a composition such that it is reducing a wustite at the temperature at which the converter is operated.

20 Claims, 4 Drawing Figures

MANUFACTURE OF STEEL AND FERROUS ALLOYS

This application is a continuation in part of my prior application Ser. No. 181,360 dated Sept. 17, 1971, and now abandoned.

This invention relates to the manufacture of steel and ferrous alloys in which a gaseous mixture of controlled composition, preferably one containing substantial amounts of hydrogen or hydrogen containing gases, is used to oxidise and remove, or partially remove carbon and other impurities from molten iron.

Present methods of manufacturing steel use air or oxygen to oxidise and remove the carbon and undesirable impurities present in the molten iron treated. The oxidising gas is blown into, or onto, the surface of the molten iron, using a flux, and the reaction is highly exothermic and consequently difficult to control and contain, so that normally the heat content of the off gases produced is wasted. For the same reason, appreciable quantities of iron are simultaneously lost as "fume" and in the slag produced. Also, in the case for example of alloy steels or ferrous alloys containing chromium, or other more easily oxidisable alloying constituents, considerable quantities of the valuable chromium are oxidised and lost in the slag. Moreover, because of the strongly exothermic and relatively uncontrollable nature of the reaction, batches of steel produced are frequently not on specification because it is not possible to stop the reaction precisely at the desired point. In the Thomas process steam and carbon dioxide have been used in admixture with oxygen as the "blow"-gases, in order to reduce the nitrogen content of steel and at the same time to moderate the violence of the reaction and improve refractory lining life, and that of other equipment. However, in the Thomas process the gaseous mixture employed still contains around 50 percent of molceular oxygen, so that the violence of the reaction is only modified in degree.

According to the present invention a converter for the production of steel or a ferrous alloy is operated as a closed system in which blow gas is fed and iron feedstock charged to the converter, gas generated in the converter is recovered and steel or ferrous alloy and slag are tapped from the converter without opening the converter to the atmosphere. Gas generated in the converter is recovered by means of a gas conduit connected to the converter by means of a gas-tight joint which does not permit appreciable ingress of atmospheric air into or engress of gas from the joint. A quench stream is introduced to reduce the temperature of gases leaving the converter and thus reduce the temperature at which the gas-tight joint has to operate. The gas-tight joint is preferably directly cooled by means of the quench stream which preferably reacts endothermically with gas generated in the converter. More preferably the quench stream is introduced through an insulated shroud which protects the sealing part of the joint from heat from gas generated in the converter.

In addition to the operation of the converter as a closed system and the use of a quench stream, preferably to directly cool the gas-tight joint, the blow gas consists of a gas mixture having a composition such that the gas mixture generated leaving the converter is reducing the wustite at the temperature of the converter. The composition of the blow gas is controlled in such a manner that it is oxidizing to carbon and the impurities it is desired to remove from the iron but generates in the converter a gas mixture which is reducing to wustite as it leaves the converter. A gaseous mixture having a composition meeting these conditions is for convenience hereinafter referred to as a "decarburizing gas" composition or mixture, and the gas mixture from which it is formed as the "decarburizing feed gas."

The fundamental reaction for the removal of carbon from molten iron is given by the Equation:

$$Fe + CO \rightleftharpoons FeO + C \tag{1}$$

and the Equilibrium Constant ($K_i$) corresponding to the molten iron system can be expressed as the Equation:

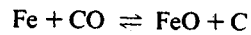

$$K_i = a_{FeO} \times a_C/a_{Fe} \times P_{CO} \tag{2}$$

where,
$a_{FeO}$ is the iron oxide activity in the melt,
$a_{Fe}$ is the iron activity in the melt,
$a_C$ is the carbon activity in the melt, and
$P_{CO}$ is the partial pressure of carbon monoxide.

Accordingly, the value of $a_C$, and therefore the percentage of carbon in the product, is directly proportional to the partial pressure of carbon monoxide in the gaseous mixture obtained when equilibrium is reached in the system. This basic equation (2) can be extended, by a thermodynamical analysis, to cover the cases of more complex decarburizing gas mixtures, such as two or more of the components carbon monoxide, carbon dioxide, hydrogen and water vapour, and it can be also taken into account that the values of the activity coefficients are affected by the presence of impurities, or alloying constituents, in the molten metal. However, it can be said in general that, when using such decarburizing gas mixtures, the value of $a_C$ is directly proportional to the partial pressure of the carbon monoxide in the equilibrium gas mixture or to a function of it.

For the oxidation of carbon in an iron melt system I find that carbon dioxide and water vapour are strong oxidants for example for the reaction:

$$C + CO_2 \rightleftharpoons 2CO \tag{3}$$

in their own right, and that the presence of free molecular oxygen is not necessary for the purpose (refer Example 1). The degree of the carbon left in the molten system is related to the amount of the carbon dioxide and/or water vapour employed.

From this condensed theoretical analysis it can be deduced that the degree of carbon removal from molten iron can be increased by carrying out the oxidation of the melt in such a manner that the partial pressure of the carbon monoxide produced is reduced either by reducing the pressure at which the reaction is carried out or by using a diluent gas in the oxidising gas mixture employed, which will also be present in the exit gases from the reaction. A combination of these two possibilities can also be used. I find, as described below, that it is preferable to use hydrogen or hydrogen containing gas as the diluent gas, and that if this is carried to its logical conclusion and a mixture of hydrogen and water vapour (as the oxidant) is taken as the decarburizing gas composition, then it is theoretically possible to remove all the carbon from the molten iron. This can be done without oxidation of the iron provided that the ratio hydrogen: water vapour does not fall below the equilibrium figure (for the reaction given in Equation (4)) at which wustite is reduced to iron at the temperture at which the reaction is being carried out (for instances as calculated from by the data given in the JANAF Thermochemical Tables for this reaction):

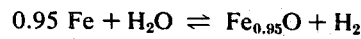

(4)

On the other hand, by using a decarburizing gas mixture containing carbon monoxide and carbon dioxide as well as hydrogen and water vapour, it is possible to obtain a product with a lower carbon content than is possible when using only carbon monoxide and carbon dioxide as the decarburizing gas mixture. It is not necessary that the decarburizing gas composition, in equilibrium with the iron melt, should originate from a gas feed containing two or more of the components carbon monoxide, carbon dioxide, hydrogen and water vapour in the desired mixture, but the desired composition can be produced in situ by, for example, reacting oxygen or air with a hydrocarbon or solid carbonaceous fuel by burning them together in a burner; or by injecting the fuel or oxidant into, or over the molten iron, which is being processed to steel, so that the final gaseous product has the desired decarburizing gas composition. Hydrogen, or hydrogen containing gases can also be utilised, either alone or in combination with hydrocarbons or solid carbonaceous fuel, as the fuel feedstock. At the high temperature employed (normally, say 1,400° to 1,800°C) equilibrium is approached almost instantaneously, and the desired decarburizing feed gas composition is obtained in situ, the composition of the feed gases being controlled so that the resulting exit gases from the reaction zone (decarburizing gas) meet the criterion that they should be oxidising to carbon but reducing to wustite at the operating temperature, as dictated by the ratios carbon dioxide: carbon monoxide, and water vapour: hydrogen in them. The choice whether the feed gas mixture, which will give this desired composition, is fed as such to the reaction vessel, or prepared partly or wholly in situ, is governed by the desired operating conditions. In situ preparation, particularly if oxygen or air is injected separately into, or over, the molten iron may increase the rate of carbon removal, while utilisation of a preformed decarburization feed gas mixture will favour a longer life for the refractory lining of the reaction vessel. When oxygen is injected separately into or over the molten metal, either as such or by means of an oxy-fuel burner, reaction kinetics have to be taken into account and the amount of oxygen so injected controlled in quantity to avoid a local build up of iron oxide in the melt. When the oxygen is injected by an oxy-fuel burner the molten metal and the hydrocarbon fuel compete for the available oxygen so that part of it is preferentially converted to iron oxide unless sufficient distance of flame travel is allowed for the hydrocarbon to oxidise before the molten metal is contacted.

I find that the use of a decarburization gas composition containing a substantial proportion of hydrogen (or a hydrogen containing gas) is particularly favourable. In the first place, not only is the partial pressure of carbon monoxide thus reduced but, also, the permissible amount of oxidant (carbon dioxide and/or water vapour) in the decarburizing gas mixture can be increased without it becoming oxidising to iron, because at the operating temperature employed the ratio $H_2O : H_2$ which is reducing to wustite is far higher than the corresponding ratio $CO_2 : CO$. The equilibrium between the gases involved is governed by the Equation:

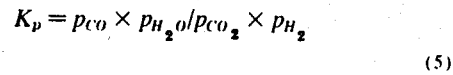

(5)

which defines the Equilibrium Constant ($K_p$) for the corresponding "shift reaction":

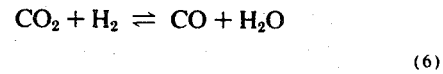

(6)

In the second place, the higher permissible oxidant content (carbon dioxide and/or water vapour), resulting from the use of hydrogen or hydrogen containing gases in the manner described, makes possible the production of a decarburizing feed gas with a sufficiently high oxidant content to remove carbon and impurities at a sufficiently rapid rate and at a sufficiently high temperature level (or alternatively its production in situ as described above with an adequate heat liberation) to facilitate the application of the invention. The reaction of carbon with carbon dioxide or water vapour is endothermic. Therefore, in order to sustain the reaction it is necessary to supply sufficient heat to the reaction zone to meet the heat requirements of these endothermic reactions, to heat the gases, iron and slag to reaction temperature, and to meet the heat losses from the reaction vessel, as well as to melt iron sponge/scrap if this is charged to the reaction vessel as well as, or instead of, molten iron. Otherwise the molten metal will be progressively cooled, until the melt solidifies and the reaction comes to a stop. Detailed thermal balances for the reaction vessel show that this condition can be more readily met, and the decarburization reaction sustained, while still maintaining a decarburizing gas composition reducing to wustite at the operating temperature, if the gas composition contains a relatively high proportion of hydrogen (or hydrogen containing gases), and particularly if oxygen rather than air is used for its preparation. The latter also has favourable influence on the quality of the steel produced, as a high nitrogen content, resulting when air is used, is detrimental to the quality of the steel. It is also advantageous to superheat both the oxygen, air or a mixture of these, and the hydrocarbon or hydrogen containing gases used as fuel, to as high a temperature as possible in order to reduce the consumption of oxygen. This superheating can be done in known equipment for the purpose such as tubular heaters, stoves, and sand or pebble stoves and heaters. It is nown, for instance, that when the latter are employed gases may be preheated to, say 1,100°C or even 2,000°C under favourable circumstances.

I find (refer Example 1 below), for example that if a gas consisting only of carbon monoxide and carbon dioxide is used as a superheated "decarburizing feed gas" and injected into molten iron the carbon is progressively removed at a rapid rate, which slows down and ultimately comes to a stop when the carbon content of the molten iron approaches the equilibrium figure corresponding to the decarburizing gas composition in equilibrium with it. This can occur when, say, approximately 60 percent of the carbon in the iron has been removed. Only a limited quantity of carbon is removed if this decarburizing gas is passed through the molten iron, even for a number of hours after this stage is reached. If, for instance (refer Example 1, below), the carbon monoxide in the "decarburizing feed gas composition is then replaced by the same amount of hydrogen, so that the gas composition comprises hydrogen and carbon dioxide only, the reaction then starts up again at a rapid rate and carbon is progressively removed until the reaction again slows to a low rate when the carbon content in the molten iron approaches equilibrium with the new decarburising gas composition leaving the vessel. Similar considerations apply to the use of more complex decarburizing gas compositions, such as those consisting of carbon monoxide, carbon dioxide, hydrogen and water vapour or of these gases with, or derived from, hydrocarbons and oxygen or air. This discovery is of the greatest importance for the manufacture of steel as, for example, the decarburizing and refining of the molten iron can be carried out by stages using, for instance a mixed decarburizing feed gas comprising carbon monoxide/carbon dioxide/hydrogen/water vapour, derived from the reaction of a hydrocarbon stream with oxygen, to heat up the iron to reaction temperature (say, 1,400°–1,800°C range) and to remove a major proportion of the carbon from the iron melt, and then use a different decarburizing feed gas composition in the second stage containing a higher proportion of hydrogen and water vapour in such proportion as is required to reduce the content of carbon and impurities in the molten metal to the desired low level demanded by the steel specification to be met. If a very low carbon content steel is required the hydrocarbon fuel used to make the decarburizing feed gas to the second stage, may be chosen so as to have a high hydrogen to carbon ratio (for example, methane), or hydrogen or a hydrogen containing gas may be used as the fuel, or added to the fuel stream to increase its hydrogen content. In the latter case an impure hydrogen stream can be used, such as is obtained by known methods, for example the reaction of hydrocarbons (the 'methane-steam reaction'), or of solid fuel (coke or coal) with water vapour or with 'off-gases' (containing water vapour and carbon dioxide) from a blast furnace or direct reduction kiln. If desired impure hydrogen can be purified, or partly purified, by the 'shift reaction' and subsequent absorbtion of carbon dioxide from the product. For the first stage a cheaper hydrocarbon fuel, having a lower hydrogen to carbon ratio can be used, for instance fuel oil. More than one stage of decarburizing feed gas injection can be employed, and different gas compositions can be used if desired in each stage. The lower the total carbon monoxide plus carbon dioxide content in the "decarburizing gas" composition employed in the final stage, the lower will be the carbon content of the resulting steel. It is possible to calculate thermodynamically the decarburizing gas composition which will give the desired carbon content in the steel produced in equilibrium with these gases.

The blow-gas which is defined as generating in the converter a gas mixture which is reducing to wustite will generally have a ratio $H_2O:H_2$ less than about 0.45 (as can be calculated from the JANAF Thermochemical Tables). Apart from this the composition of the blow-gas is fixed by the composition (C:H ratio) of the hydrocarbon feedstock used according to the "shift reaction" equilibria so that the CO content, for example will range from about 33 vol % for gas ex methane to about 60–65 vol % for fuel oil in the decarburizing feed gas. The optimum value for $H_2O:H_2$ varies from case to case but, assuming no supplementary electric heating of the converter is used, is controlled by the "heat balance" for the case usually at around 0.10 to 0.30 depending on the degree of preheat of the feedstocks. The lower the value of this "ratio" the lower the FeO content of the slag and the longer the refractory lining life will be.

Although theoretically possible I regard the use of hydrogen as such, for the manufacture of steel as uneconomic because of its relatively high cost and I find it unnecessary even for the manufacture of stainless steel with C percent below 0.1 percent. However the use of hydrogen to enrich a blow gas derived from a hydrocarbon may be economic. It is a preferred feature of the invention that the decarburizing feed gas contain not less than 10 vol % CO (dry basis).

This invention can be applied either to batch operation, semi-continuous flow operation, or continuous flow operation for the manufacture of steel, alloy steels or ferrous alloys. For batch operation a batch of molten iron is decarburized and refined by treating it with a decarburizing feed gas mixture, using one or more successive gas compositions, as described above. For semi-batch operation, two or more reaction zones are provided with means for transferring the molten metal from one zone to another in successive batches and the superheated decarburizing gas mixture from one zone to another continuously. Gas and molten metal flow is preferably counter-current, but subsidiary decarburizing feed gas streams may be injected in parallel flow with the main decarburizing feed gas stream into one or more reaction zones. For continuous flow operation a system similar to that described for semi-continuous flow operation may, for example, be used, but with means provided for the continuous, or substantially continuous flow of molten metal from one reaction zone to another. Alternatively a fully continuous flow system can be used in which the superheated decarburizing feed gas mixture (or successive gas compositions) are contacted with the molten metal in continuous flow operation, which is preferably counter-current, but which can be concurrent if desired. Flux for the refining of the molten metal, with the consequent production of slag, can be added to one or more of the reaction zones in the customary manner. For instance, it can be added as such, blown into the reaction zone as a suspension in one or more of the gas streams charged to the zone; or if iron sponge is charged partly, or wholly as the metal feedstock (preferably preheated as much as possible), then the flux can be introduced with it either as such or in the form of a reduced "prefluxed" sinter. Optimum use of flux is assisted by using different temperatures for the successive reaction zones, within the range, e.g. of 1,200° to 1,900°C. Means are provided in all cases for charging the metal to the system and for tapping-off the molten metal and slag in accordance with customary practice but without opening the converter to the atmosphere so as to retain it as a closed system.

When steel is manufactured by the methods currently employed (for example the Thomas or Kaldo processes) the heat content of the process gases is normally wasted, as it is difficult or impossible to collect them for use. When operating in accordance with this invention the reaction of the superheated decarburizing feed gas composition with the carbon in the molten iron is endothermic, and uncontrollable reaction of "oxidising" gases with the metal does not take place. This, together with the introduction of a quench stream and preferably the use of a reactive quench stream to directly cool the joint between the converter and the gas conduit which would otherwise be subjected to the full heat of the process gases, means that the reaction can be carried out in a closed system, i.e., without opening the converter to the atmosphere in the introduction of starting materials or the recovery of products.

Not opening the converter to the atmosphere has great environmental advantages but it also means that the hot gases coming from the reaction zone can be collected and the sensible and potential heat fully recovered and utilised. For example, they can be used as superheated reducing gases for the reduction of iron ore using any known process, such as Bosch injection in a blast furnace, or for the direct reduction to iron in a rotary kiln or fluidised bed process. The superheated gases leaving a reaction zone in which steel is being produced normally have a temperature in the range of about 1,400° to 1,800°C., and it is necessary to "quench" these gases as they leave the reaction zone to a lower temperature with a quench stream, preferably a quench stream which reacts endothermically with the gases, most preferably by mixing them with a hydrocarbon stream (which may also be superheated) so that the exit gases may be more readily utilised and handled. This quenching operation may be carried out in one or more stages with a portion of the quench stream used to cool the converter gas phase and the remainder used to directly cool the joint between the converter and the conduit by which the gases are collected. For example, by mixing the gases from the reaction zone with a controlled amount of hydrocarbon so that the temperature after mixing is about 1,200°-1,300°C. (or lower), much of the carbon dioxide and/or water vapour present in the reaction gases can be converted to carbon monoxide and/or hydrogen by reaction with the hydrocarbon, so that a reducing gas more suitable in composition and temperature for the reduction of iron ore will result.

The hydrocarbon stream used as fuel for generating, partly or wholly the decarburizing feed gas mixture, and as the "quench" stream, can be, for instance crude oil, fuel oil, naphtha, natural gas or any other hydrocarbon fraction, but preferably it should have a low sulphur content and a high hydrogen to carbon ratio. I find that natural gas and petroleum tops/naphtha fractions (containing an average of from 1 to 13 carbon atoms per molecule) are particularly suitable for meeting these criteria. As this invention does not rely on the combustion of impurities, such as sulphur and phosphorus, present in the molten iron or alloy, or in the combustion of the metal itself, to provide the heat for sustaining the reaction, it is particularly applicable to iron which has a relatively low content of carbon and impurities. For instance, "sponge iron" produced by the "direct reduction" of ore/sinter/pellets, preferably produced from high grade ores, is particularly suitable. Part of the impurities present in the iron feedstock are removed as hydrides, for instance sulphur as hydrogen sulphide, when using a decarburizing gas with a relatively high hydrogen content.

According to the invention the quench stream may be introduced at one or more points: into the converter gas phase, the gas exit nozzle from it, the gas conduit to which it is connected, or in any combination of these and is preferably also used to directly cool the joint between the converter and the gas conduit. The gases so recovered can then be used, for example, directly or indirectly for the reduction of iron ore, or other metallic ores, or as a fuel gas.

The iron feedstock which may be used includes iron sponge, iron powder or briquettes from a process for the direct reduction of iron ore; hot metal from a blast furnace; scrap steel or iron; or any combination of these. Means should generally be provided for the introduction of solid feedstock, and of liquid feedstock (in the case of liquid feedstock it can be added in such a way that the molten metal acts as a gas seal). In this manner charging of feedstock can be made without disconnecting the converter. Iron sponge used can contain partly reduced iron oxide.

The quench stream is introduced so as to cool the gases leaving the converter to a degree which permits the design of a gas-tight joint connecting the converter to the gas conduit and other equipment which operates without the difficulties which arise at high temperatures. This is preferably done by introducing the quench stream through an insulated shroud which protects the joint from the heat from the superheated process gases. The gas-tight joint which is preferably cooled by the quench stream can be of any suitable design, for example, rotary or flexible (bellows type), or a combination of these, since use of the quench stream cools the sealing part of joint to a temperature at which it can be safely operated. This permits the rotation of tilting of the converter for tapping, without disconnecting the converter, and/or the free rotation of the gas conduit to which it is connected. The quench stream can be preheated to a temperature below the safe operating temperature of the sealing parts of the joint, and the converter can operate at any pressure, atmospheric, sub-atmospheric or super-atmospheric.

The quench stream preferably reacts endothermically with the gases produced in the converter and is most preferably one or more liquid or gaseous hydrocarbons, or a mixture of these with a gas containing carbon dioxide and/or water vapour capable of reacting with the hydrocarbons to give a reducing gas, or a hydrogen containing gas, or any combination of these. For instance the "off-gas" from a blast furnace or process for the direct reduction of iron ore may be used. Any liquid or gaseous hydrocarbon or mixture of them may be used, for example: natural gas, petroleum naphtha or tops, fuel oil or crude oil. The hydrogen containing gases may consist for example, of the gases from the methane steam generator, a solid fuel gas generator, such as Water gas or Blue Water gas, or from a solid fuel gas generator operating on a mixture of oxygen (or air or a mixture of them) and off-gases from a blast furnace or direct reduction process for iron ore.

The reducing gases so produced may be used for the reduction of iron ore, or other metallic ores, for example in a blast furnace or process for the direct reduction of iron ore. In order that the carbon dioxide and water vapour present in the converter process gas, and in the off-gases referred to above, may react adequately to produce a good quality reducing gas, the quench is better carried out in two or more stages. For example, in the first stage the temperature of the mixed gases can be reduced to around 1,300° to 1,400°C. at which temperature they react rapidly to yield reducing gases (carbon monoxide and/or hydrogen), and thereafter the temperature reduced in a second stage quench to that which is optimum for the reduction of the ore in the reduction process chosen, for example, around 900° to 1,100°C. The reducing gases can contain unchanged hydrocarbons, and this can advantageously amount to say 5 to 10 mole percent.

The blow gas used in the converter, to oxidise the carbon and impurities in the melt is a superheated gas mixture (decarburizing feed gas) consisting of carbon monoxide and carbon dioxide, hydrogen and water vapour, or a mixture of these gases, in which the ratio of oxidant (carbon dioxide and/or water vapour) to reducing gases (hydrogen and/or carbon monoxide) in this decarburizing feed gas is controlled so that the gas mixture leaving the converter decarburizing gas) has a carbon dioxide: carbon monoxide and water vapour: hydrogen ratio such that it is reducing to wustite at the temperature at which the converter is being operated. The decarburizing feed gas can be injected into and/or over the molten slag and metal surfaces. The decarburizing feed gases can also contain some unconverted hydrocarbons. The use of a decarburizing feed gas containing carbon dioxide and water vapour is highly advantageous as their reaction with carbon in the molten metal is endothermic, so that the reaction is not explosive as it is with oxygen, thus facilitating the operation of the converter in a closed, gas-tight system, and diminishing the formation of fume and splashes.

The superheated decarburizing feed gases need not be fed to the converter as such, but may be wholly, or partly, generated at the time of injection. For example, a stream of hydrocarbons can be burnt with sufficient oxygen (and/or air) to generate a decarburizing feed gas having the desired composition and temperature, using burners, lances or oxy-fuel lances for the purpose.

During the initial stage of the blow, oxygen or the gas flame from an oxy-fuel burner may be directly injected into, or onto the surface of, the molten metal in the converter, or the decarburizing feed gas composition may have a greater oxidant content (carbon dioxide/water vapour) than will result in a decarburizing gas which is reducing to wustite. This method of operation speeds up the decarburizing and refining reaction at the expense of increased iron oxide, and the amount of such oxidant feed has to be carefully controlled to avoid excessive amounts. A second stage of the blow is then employed in which injection of oxygen per se into or over the melt, as such or by means of an oxy-fuel burner, is discontinued, and the decarburizing feed gas composition adjusted so that the decarburizing gas formed is reducing to wustite. In this manner any excess iron oxide formed in the first stage is reduced in the second stage and a slag having a low iron content results.

At the end of the blowing period, a short final blow may be given with oxygen to reduce the hydrogen content of the steel melt; or with carbon monoxide, or a mixture of carbon monoxide and carbon dioxide reducing to wustite, or with an inert gas in order to reduce the hydrogen and oxygen contents of the steel. Flux may be added to the converter, and/or blow in by means of one or more of the gas streams used; and slag may be tapped off in one or more stages in accordance with established practices in the art, these operations being carried out in such a way that the converter is not opened to the atmosphere.

Electric furnace facilities may be incorporated into the converter in order to supplement the heat load requirements of the converter.

The converter may be combined with equipment for the direct reduction of iron ore, in a single gas-tight system by means of gas-tight joints, and hot iron sponge may be fed directly and continuously to the converter and quenched process gases from the converter fed to the direct reduction process plant at the optimum temperature for the reduction of iron ore. The steel so formed may be tapped off from the converter either continuously or batchwise, particularly when the sponge iron is made from a high grade ore. The direct reduction process plant may be of the rotary kiln-type, the stack-type (for example the Wiberg process), or one which utilises fluidised beds.

In this manner steel can be made from iron ore in one single integrated process, with extremely high thermal efficiency. One or more steel converters may be connected in parallel with a partial combustion burner or burners, and/or some other system for generating reducing gases (for example a methane steam plant), and in which the quantity and rate of flow the the gases or vapours used as feedstocks are controlled as hereinafter described. The individual streams of feedstocks comprising the total amounts fed to the process, which consist of fuels (hydrocarbons, hydrogen containing gases/recycle process off-gases) and oxygen or oxygen and/or air, are controlled so as to provide the rate and amount of reducing gases required for the reduction of the ore at the optimum temperature for it. The total amount of the feedstocks is then divided as follows:

a. The rate and amount of each feedstock stream to the converter (or each converter if more than one is used) is controlled so as to provide the rate and amount needed to meet the converter's blowing schedule, and the control varied to meet this as desired.

b. The balance of the total feedstocks are then divided between the partial combustion burner(s), and or reducing gas generating system, and the quench streams (controlled as required), so as to obtain reducing gases at the optimum temperature and with the optimum composition for the reduction of the ore.

"Finishing" material, and/or alloy constituents may be added to the molten steel in accordance with established practices in the art.

In order that the invention may be more fully understood one embodiment for the production of a very low carbon steel using semi-batch operation, will be described by way of illustration only with reference to the accompanying FIG. 1 which is diagrammatic only.

Figure 1:
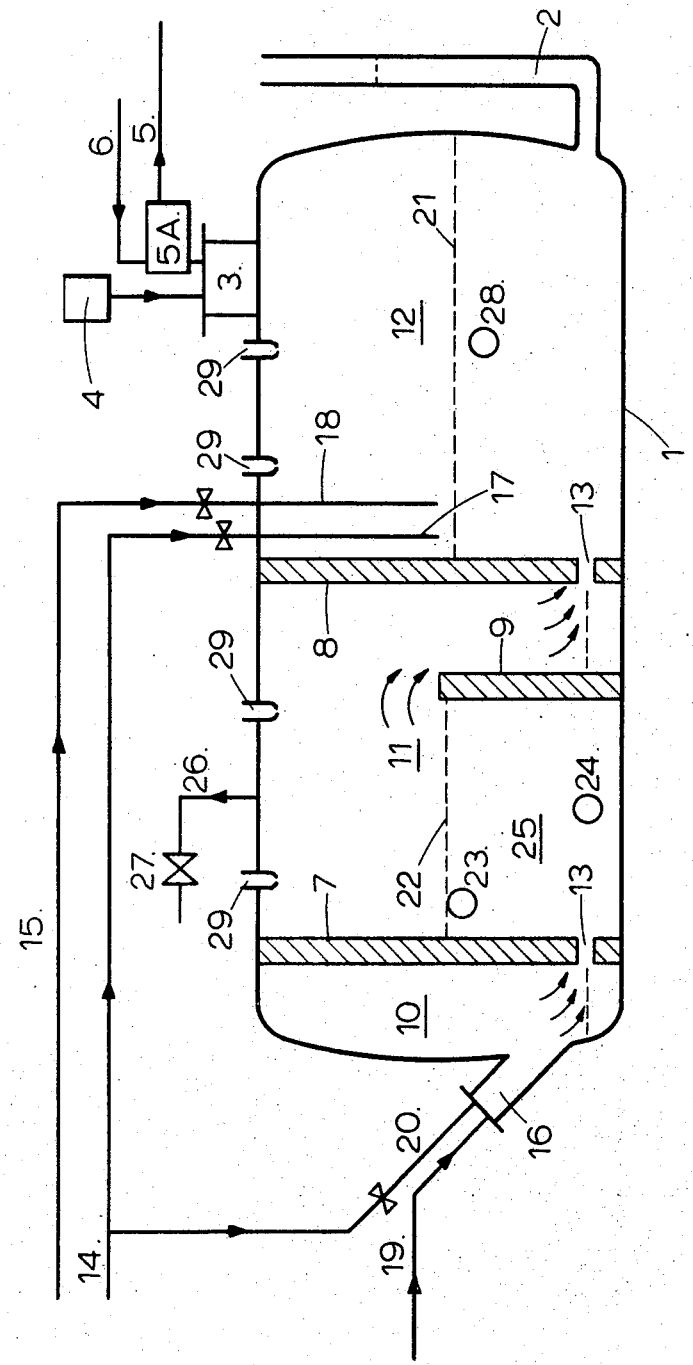
FIG. 1 is a diagrammatic illustration of one embodiment of the process of the invention for the production of a very low carbon steel using semi-batch operation.

In FIG. 1 a reaction vessel 1, which has a refractory lining, is equipped with a feed line 2 through which molten metal can be introduced either continuously or intermittently, and an opening 3 through which flux and/or iron sponge or scrap can be introduced by charging equipment 4 and process gas removed through line 5, using a gas-tight joint 5A. A quench line 6 is connected into line 5 and the quench used to directly cool joint 5A through which a hydrocarbon stream, or other suitable quench material can be introduced. Subsidiary quench inlets 29 into the converter are also provided. This serves to cool the gases in the converter in two stages as described above and can also have the effect of cooling the roof of the converter. The interior of the reaction vessel is equipped with gas phase partitions 7 and 8 and liquid phase partition 9, which divide the reaction vessel into three reaction zones: a combustion zone 10, a final decarburizing zone 11, and a preliminary decarburizing zone 12. The partitions are refractory clad, and interiorly cooled by air, water or one of the gas streams to be charged to the system, and the gas partitions 7 and 8 contain openings 13 in their lower part, so that gas can pass through them from zone 10 to 11, and from zone 11 to 12 respectively. Preheated oxygen is introduced through line 14 (via line 20) to burner 16 and to lance 17 into reactions zone 10 and 12 respectively. Superheated methane (or other hydrocarbon stream) is introduced as fuel through line 15 and lance 18 into reaction zone 12. A superheated fuel gas of high hydrogen content is introduced through line 19 and burner 16 into reaction zone 10. Means are provided for removing and replacing the burner 16 and lances 17 and 18. Lances 17 and 18 are preferably combined together as an oxy-fuel burner. Flow control means (not shown) are provided so that the proportion of hydrocarbon fuel to oxygen, and of high hydrogen content fuel to oxygen can be regulated, as described above to give the desired decarburizing gas compositions in reaction zones 11 and 12. A suitable molten iron level 21 is held in reaction zone 12, and a molten material level 22 established in reaction zone 11, as described below, and this level normally maintained by liquid phase partition 9. The molten metal levels at the bottom of reaction zone 10, and between gas phase partition 8 and liquid phase partition 9, in reaction zone 11, are established by the gas pressures in reaction zones 10 and 11 which are slightly lower in successive zones so that decarburizing gas from zone 10 is forced through the gas openings 13 in gas partition 7 and bubbles through the metal bath 25 in reaction zone 11. Similarly gas from reaction zone 11 is forced through the metal bath in reaction zone 12. Thus the molten metal is partly decarburized and refined in reaction zone 12, and the carbon content is then reduced to the required steel specification in reaction zone 11 by the decarburizing gas composition having a high hydrogen content. Means for tapping off molten slag 23 and steel 24 from reaction zone 11, and for slag 28 from reaction zone 12, are provided. After the initial charge, operation proceeds as follows: slag and molten steel are removed through taps 23 and 24. The molten metal level 22 of metal bath 25 in reaction zone 11, which is retained by partition 9, is then restored by inducing a gas pressure differential between reaction zones 11 and 12 so that molten metal is forced through the openings 13 in gas partition 8 and flows over partition 9 into metal bath 25. This can be done by cutting off the supply of oxygen and fuel to burner 16, and venting reaction zone 11 through vent line 26 and valve 27, while maintaining pressure in reaction zone 12. Valve 27 is then closed and oxygen and fuel again supplied to burner 16 through oxygen feed line 20 and fuel feed line 19. The molten metal level in reaction zone 12 is then reestablished by charging molten iron through feed line 2, a gas seal being maintained in it by the molten metal level in that zone. Normal operation is then continued, as described above, until specification steel is obtained in reaction zone 11, and the cycle of operations repeated.

If steel having a normal carbon content of around 0.1 percent is required much simpler equipment can be employed, particularly if the raw iron feedstock was produced from a high grade ore, preferably in a direct reduction kiln. In such cases a normal type of converter design, similar for example to that used in the Basic Oxygen Steel process (BOS) or in the Rotor process, can be used, with a decarburizing feed gas being formed by the injection of hydrocarbons and oxygen in oxy-fuel burners, instead of oxygen. The gas tight joint 5A connecting line 5 to opening 3, shown in FIG. 1, is retained, comprising a rotary or flexible type of joint (such as that shown in detail in FIGS. 3 and 4), or combination of these, so that the gas conduit can be rotated and the vessel can be tapped by rotation or tilting without having to disconnect the vessel. Means of charging solid iron feedstock 4, such as iron sponge or scrap, and the feed pipe 2 for liquid iron are retained also. The converter is then operated with charging and tapping being conducted either batchwise or continuously. A quench stream is introduced through line 6, and the resulting reducing gases used for reduction of iron ore, at the optimum temperature required for this operation (say, between 700° and 1,100°C., and preferably around 900° to 1,000°C), for example in a rotary kiln or other suitable known equipment.

Figure 3:
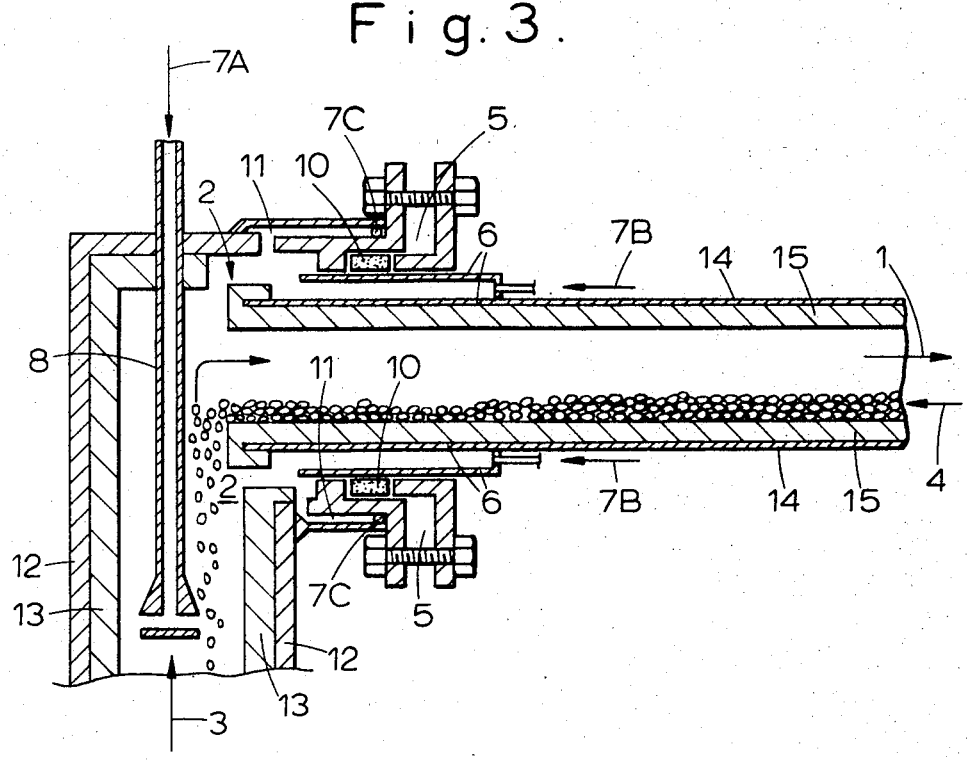
FIG. 3 is a diagrammatic representation in cross-section of a quench cooled joint of the rotary type.
Figure 4:
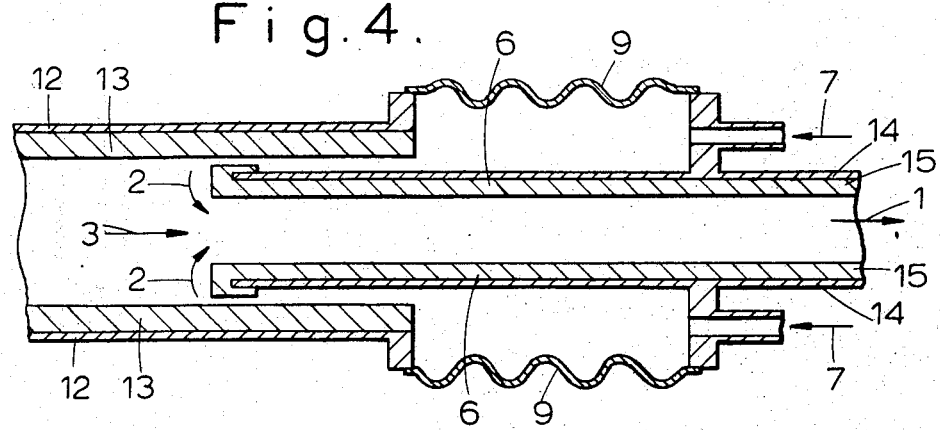
FIG. 4 is a diagrammatic representation in cross-section of a quench cooled joint of the tilting type.

Two types of quench-cooled joint are described by way of illustration with reference to FIGS. 3 and 4 of the drawings.

FIG. 3 shows one type of rotary joint for connecting a rotary kiln to a converter in which the joint sealing device of conventional design — whether packing, mechanical seals or other known design — is cooled and shielded from the heat (including radiant heat) of the superheated gases coming from the converter, so that the joint sealing device is maintained at a lower temperature at which the sealing device can operate in a gas tight manner, without ingress of atmospheric air or egress of process gases from said joint. The joint connects the outlet nozzle of the converter which consists of metal walls 12 with refractory or insulating lining 13 and is fixed, to a gas conduit which is rotatable and consists of metal walls with a refractory or insulating lining 15. A quench cooled insulated shroud 6 rotates and is extended as the gas conduit (14, 15) beyond the joint to deliver the quench process gases to a rotary ore reduction kiln (not shown), being joined rigidly to the outlet nozzle of the kiln. Means (not shown) are provided to allow the quench stream to be fed to inlet 7B as the shroud rotates. Reduced iron ore 4, discharged from the kiln, passes (counter current to reducing gases 1 from the converter) through the joint on its way to the converter. Superheated converter gases 3 (at, say about 1,600°C) flow into the inner passage through the joint and are cooled by a quench stream passing from inlet 7A to primary quench lance 8. The resulting quenched converter gases (at, say, about 1,350°C) pass to the inlet to the inner passage of the insulated shroud 6 where they meet a further "secondary" stream of quench gases 2 which have passed through the annular space circumferentially surrounding the insulated shroud 6 which is fed with the secondary quench stream through quench inlet 7B. The secondary quench stream on admixture further cools the superheated gases to the temperature (say, about 1,100°C) desired for delivery of the resulting reducing gases to the rotary ore reduction kiln. The sealing device for the rotary type gas tight joint is of conventional design comprising high temperature packing 10 in a stuffing box by a packing gland and packing gland bolts 5. A subsidiary circumferential annular cooling space 11 fed by a quench stream through quench inlets 7C may also be provided to protect the packing device from heat conducted through the metal walls of the superheated gas inlet nozzle to the joint, which is conducted through the walls towards the packing device.

FIG. 4 shows one type of "bellows sealed" gas tight joint, which is of the "tilting-type", i.e., the two halves of the joint are capable of independent movement with relation to the axis of the joint as well as of compression or extension in axial direction, a feature valuable for taking up expansion or contraction changes due to temperature alteration. Again the joint connects the outlet nozzle of the converter which consists of metal walls 12 with refractory or insulating lining 13 to a gas conduit consisting of metal walls 14 with refractory or insulating lining 15. A bellows seal 9 is of conventional design (the customary tie and limit rods are not shown) for such flexible or expansion joints, but again in this case is protected and shielded from the heat of the superheated converter gases by an insulated shroud 6, which is cooled by a quench stream entering through inlet 7. Quench gases 2 leaving the cooling space of the insulated shroud then mix with superheated gases 3 coming from the converter, and the resulting mixture of quenched gases 1 is delivered to a gas conduit for further use — for instance, at the desired temperature (say, about 1,100°C) for delivery to an iron reduction plant (not shown).

It will be noted that in the case of FIG. 3 hot reducing gases and reduced iron ore are shown as passing counter-current to one another through the joint. When the joint 5A is used in the process of FIG. 1 an additional feed point for solid feedstock, such as fragmented scrap, flux or reduced iron ore as briquets, is also provided as charging equipment 4.

The following Examples illustrate the invention:

EXAMPLE 1

Figure 2:
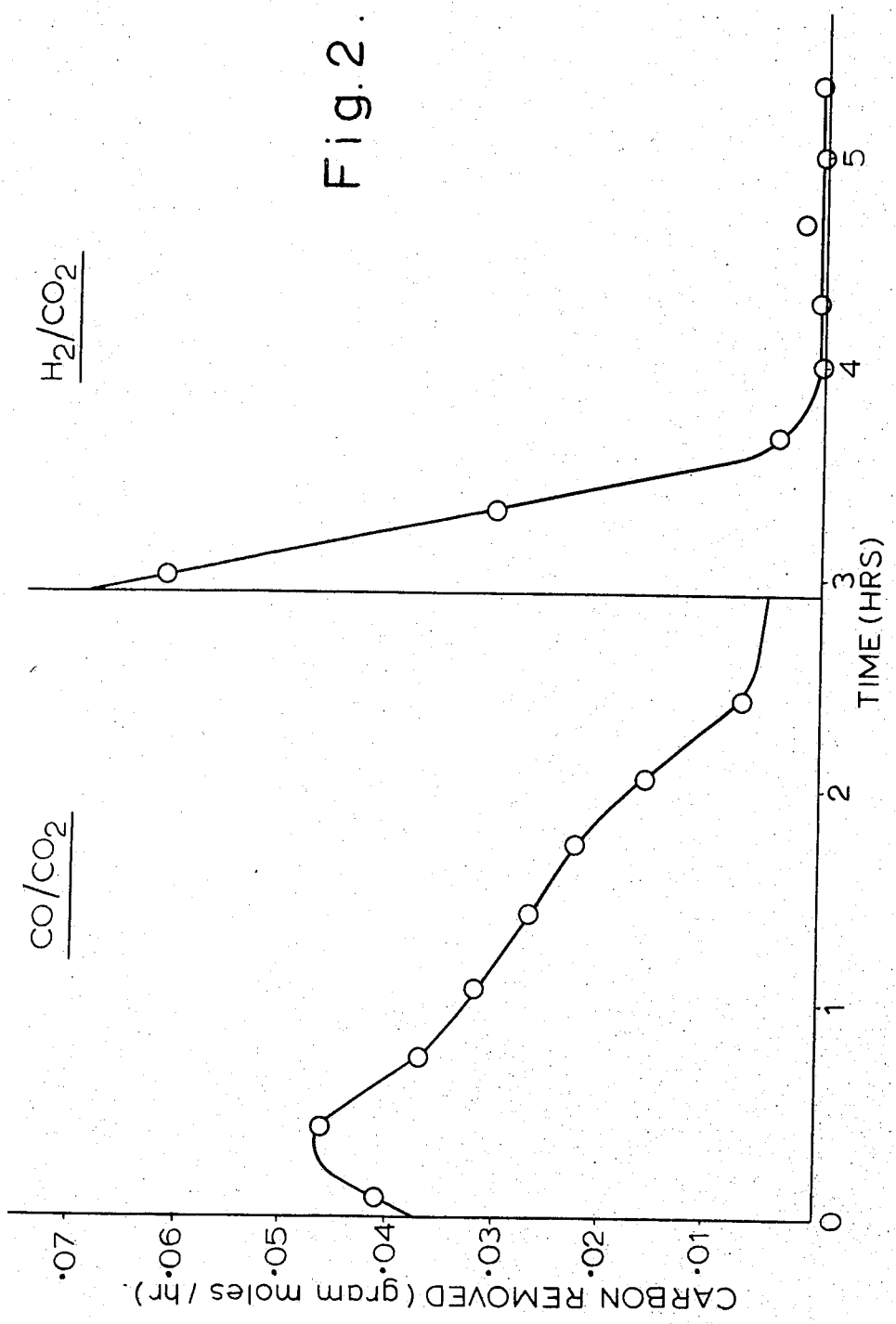
FIG. 2 is a graphical representation of amount of carbon removed (in gram moles/hour) aganst time (in hours) for the process of Example 1.

50 grams of cast iron (analysis $C = 3.15$ percent, $P = 0.9$ percent), placed in a converter simulating batch processing, were reacted with a continuous oxidising gas stream at the rate of 0.635 gram moles/hour of carbon monoxide and 0.070 gram moles/hour of carbon dioxide at a temperature of 1,500°C. Measurement of the exit gas composition showed an initially rapid rate of carbon removal, which fell off as the experiment continued and finally approached zero as equilibrium with the exit gases (decarburizing gas composition) was approached. The composition of the oxidising gas stream was then changed so that it comprised 0.0709 gram moles/hour of carbon dioxide and 0.619 gram moles/hour of hydrogen, the temperature being raised to 1,540°C (it can be advantageous to increase the reaction temperature in the successive decarburizing stages). Rapid carbon removal from the melt recommenced with the new oxidising gas composition, which again fell off as the reaction proceeded and approximated finally to zero as equilibrium with the exit gases (decarburizing gas composition) was approached. The initially rapid rate of carbon removal followed by a falling off as equilibrium is reached is shown for both blow gas compositions in FIG. 2 of the drawings which shows a plot of the rate of carbon removal (in gram moles per hour) against time (in hours) for the process of this Example. The decarburizing gas composition, measured towards the end of the run, was:

| | Volume (Mole)% | |
|---|---|---|
| | (wet basis) | (dry basis) |
| Hydrogen | 80.11 | 88.98 |
| Carbon Monoxide | 9.43 | 10.48 |
| Water Vapour | 9.97 | — |
| Carbon Dioxide | 0.49 | 0.54 |
| TOTAL: | 100.00 | 100.00 |

The converter was then cooled with a stream of nitrogen. The resulting yield of steel was 47.5 grams, or 95 percent of the raw iron treated. Its carbon content was 0.38% wt. and its phosphorus content 0.44% wt. Flux comprising 0.4 grams of magnesium oxide and 0.6 grams of calcium oxide were mixed with the raw iron charge to the converter.

EXAMPLE 2

60 grams of raw iron, with 10 grams of calcium oxide as flux, were processed to steel at 1,550°C., in a similar manner to that used in Example 1, using a decarburizing feed gas derived from 0.9358 gram moles/hour of hydrogen (74.8 percent) and 0.2519 grams moles/hour of carbon dioxide (25.2 percent) and the blow continued for 1.9 hours. The steel resulting had a very low content of carbon, silicon and phosphorus (because a basic slag resulted from the use of a magnesia crucible, in contrast to Example 1 where an alumina crucible was used and the slag was of the acid type). The analyses of the iron feedstock and the resulting steel were:

| Analysis | Iron Feedstock | Steel Produced |
|---|---|---|
| Carbon content, weight % | 1.87 | 0.025 |
| Silicon content, weight % | 1.62 | 0.01 |
| Phosphorus content, weight% | 0.53 | 0.007 |

The percentage of iron in the slag was low: 7.2 wt.%.

The decarburizing gas leaving the apparatus towards the end of the run was clean and free from fume, and had the following composition:

|  | Volume (Mole)% | |
|---|---|---|
|  | (wet basis) | (dry basis) |
| Hydrogen | 53.5 | 67.9 |
| Carbon monoxide | 22.2 | 28.2 |
| water Vapour | 21.2 | — |
| Carbon dioxide | 3.1 | 3.9 |
| TOTAL: | 100.0 | 100.0 |

A similar run in which the blowing time was extended to 2.5 hours gave a slag with an iron content of 8.8 wt.%, demonstrating that for Example 2 equilibrium had been approached (the carbon dioxide:carbon monoxide ratio for the second run was somewhat higher, so that a slightly higher iron content of the slag would have been expected), and that no appreciable further oxidation of the iron had occurred with the extended blow — as would have been the case with conventional oxygen blowing.

EXAMPLE 3

90 grams of sponge iron produced in a laboratory experimental rotary kiln, by the direct reduction of Consett pre-fluxed sinter, were melted/refined in an alumina crucible in a similar apparatus to that used for Example 1. The iron content of the iron sponge was 73.3 wt. %. The decarburizing feed gas composition was carbon dioxide 3 vol. %, and hydrogen 97 vol. %.

66.88 grams of steel having the following analysis resulted:

|  | Analysis of Steel |
|---|---|
| Carbon content, weight % | 0.049 |
| Phosphorus content, weight % | 0.27 |

The phosphorus content of the steel was high because an alumina crucible was used, and the slag was of the acid type, while the percentage of oxidant in the decarburizing feed gas was low. The phosphorus content of the steel corresponds approximately to that of a high phosphorus, free machining steel, and demonstrated the flexibility of the process, and the ability to produce steel from iron sponge directly, the melting/refining taking place easily while the steel yield is virtually 100 percent of the iron content of the original sinter reduced to iron sponge.

EXAMPLE 4

60 grams of raw iron and 10 grams of calcium oxide as flux were melted and refined in a magnesia crucible in a similar apparatus to that used for Example 1, except that an oxy-fuel burner was used to generate the decarburizing feed gas in situ. The oxy-fuel burner was designed to give adequate combustion, and was fed with 0.3964 gram moles/hour of oxygen and 0.6044 gram moles/hour of methane, so that the decarburizing feed gas resulting, and therefore also the decarburizing gas subsequently formed on reaction with the impurities in the metal, was reducing to wustite at the temperature of the melt. This temperature was around 1,550°C. The blowing operation with the oxy-fuel was continued for 18 minutes. The yield of steel resulting was 59 grams, or substantially theoretical. The crucible and apparatus was remarkably clean.

The analyses of the iron feedstock and the resulting steel were:

| Analysis | Iron Feedstock | Steel Produced |
|---|---|---|
| Carbon content, weight % | 1.60 | 0.09 |
| Silicon content, weight % | 1.40 | — |
| Phosphorus content, weight % | 0.45 | 0.17 |

A similar run was made with an oxy-fuel burner giving inadequate combustion showed, in contrast, gross oxidation of the metal so that only about 65 percent of the metal was recovered as such, and the crucible was destroyed by the large amount of slag formed.

EXAMPLE 5

48.5 grams of sponge iron, derived in a laboratory kiln from prefluxed Consett sinter were added during 1 hour to a pool of 50 grams of cast iron, and 7 grams of calcium oxide contained in a magnesia crucible. A decarburizing feed gas of hydrogen (0.812 gram moles/hour), carbon monoxide (0.374 gram moles/hour) and carbon dioxide (0.056 gram moles/hour) was blown through the melt which attained a final temperature of 1,535°C. The analyses of the feedstocks and the final steel billet were as follows:

|  | Sponge iron | Cast iron | Steel |
|---|---|---|---|
| Carbon content, wt % | 0.25 | 4.3 | 0.4 |
| Phosphorus content, wt % | 0.004 | 0.15 | 0.002 |

The slag contained 9.9 percent ferrous oxide and 92 percent of the iron was recovered in the steel. This example illustrates the processing of sponge iron and cast iron together.

I claim:

1. Method for the production of steel or a ferrous alloy in a converter comprising the steps of:
   i. charging metallic iron feedstock containing minor amounts of non-ferrous elements to said converter to provide a pool of molten metal in said converter;
   ii. refining said molten metal by blowing it with a decarburizing feed gas said decarburizing feed gas being such that a decarburizing gas mixture is generated which on leaving said converter is reducing to wustite at the temperature at which said converter is operated;
   iii. recovering said gas generated in said converter by means of a gas conduit connected to said converter by means of a gas-tight joint which does not permit appreciable ingress of atmospheric air into or egress of gas from said joint;
   iv. introducing a quench stream to reduce the temperature of gases leaving said converter;
   v. tapping steel or ferrous alloy and slag in molten from from said converter; and
   vi. operating said converter as a closed system in which said blowing with decarburizing feed gas, said charging with iron feedstock, said recovery of gas generated in said converter and said tapping of steel or ferrous alloy and slag from said converter are effected without opening of said converter to the atmosphere.

2. Method according to claim 1 in which said gas-tight joint from said converter to said gas conduit is directly cooled by said quench stream which reacts endothermically with said gas generated in said converter.

3. Method according to claim 1 in which said decarburizing feed gas is selected from the group, consisting of mixture of carbon monoxide, carbon dioxide, hydrogen and water vapour and gas mixture which generate mixtures of carbon monoxide, carbon dioxide, hydrogen and water vapour in situ in said converter.

4. Method according to claim 2, in which said quench stream is introduced through an insulated shroud which protects the sealing part of said joint from heat from said gas generated in said converter.

5. Method according to claim 4, in which said joint permits rotation or tilting of said converter for said tapping without disconnecting said converter from said gas conduit.

6. Method according to claim 1, in which said decarburizing gas contains carbon monoxide in an amount of not less than 10 percent by volume (dry basis) based on the total volume of the decarburizing gas.

7. Method according to claim 1, in which said decarburizing feed gas is produced by burning a hydrocarbon in a gas selected from the group consisting of oxygen and air.

8. Method according to claim 1, in which said quench stream is selected from the group consisting of liquid hydrocarbons, gaseous hydrocarbons, mixtures of hydrocarbons with carbon dioxide and/or water vapour, hydrogen and mixtures thereof.

9. Method according to claim 8, in which said quench stream is selected from the group consisting of natural gas, petroleum naphtha, petroleum tops, fuel oil and crude oil.

10. Method according to claim 2, in which one or more further quench inlets are provided into said converter so that said gases generated in said converter are reduced in temperature in at least two stages.

11. Method according to claim 9, in which in a first quenching stage said gases generated in said converter are cooled to a temperature of about 1,300° to 1,400°C and are thereafter further reduced in temperature in a second quenching stage.

12. Method according to claim 1 which further comprises the steps of initially blowing said molten metal with an oxidising gas having a greater oxidant content than will generate a gas mixture in said converter which is reducing to wustite and subsequently blowing said molten metal with a decarburizing feed gas having a composition such that it will generate a decarburizing gas mixture leaving said converter which is reducing to wustite.

13. Method according to claim 1, in which said gas recovered by means of said gas conduit is used for reduction of iron ore or other metallic ore.

14. Method according to claim 1, in which liquid iron feedstock is charged to the converter in such a way that molten metal acts as a gas seal.

15. Method for the production of steel in a converter comprising the steps of:
  i. charging iron feedstock to said converter to provide a pool of molten metal in said converter;
  ii. refining said molten metal by blowing it with a decarburizing feed gas, said decarburizing feed gas being selected from the group consisting of mixtures of carbon monoxide, carbon dioxide, hydrogen and water vapour and gas mixtures which generate mixtures of carbon monoxide carbon dioxide, hydrogen and water vapour in situ in said converter, the ratio of oxidant (carbon dioxide, water vapour) to reducing gases (hydrogen, carbon monoxide) being such as to generate a decarburizing gas mixture which on leaving said converter has a carbon dioxide to carbon monoxide and water vapour to hydrogen ratio such that it is reducing to wustite at the temperature at which said converter is operated;
  iii. recovering said gas generated in said converter by means of a gas conduit connected to said converter by means of a gas-tight joint which does not permit appreciable ingress of atmospheric air into or egress of gas from said joint but which permits rotation or tilting of said converter without disconnecting said converter from said gas conduit;
  iv. introducing a quench stream selected from the group consisting of liquid hydrocarbons, gaseous hydrocarbons, mixtures of hydrocarbons with carbon dioxide and/or water vapour, hydrogen and mixtures thereof to reduce the temperature of gases leaving said converter;
  v. tapping steel and slag in molten form from said converter; and
  vi. operating said converter as a closed system in which said blowing with decarburizing feed gas, said charging with iron feedstock, said recovery of gas generated in said converter and said tapping of steel and slag from said converter are effected without opening of said converter to the atmosphere.

16. Method according to claim 14 in which said quench stream is introduced to directly cool said gas-tight joint from said converter to said gas conduit.

17. Method according to claim 14 in which said decarburizing gas contains carbon monoxide in an amount of not less than 10 percent by volume (dry basis) based on the total volume of decarburizing gas.

18. Method according to claim 15 in which said gas-tight joint is a rotary-type joint.

19. Method according to claim 15 in which said gas-tight joint is a bellows type joint.

20. Method for the production of steel in a converter comprising the steps of:
  i. charging iron feedstock to said converter to provide a pool of molten metal in said converter;
  ii. blowing said molten metal with an oxidising gas having an oxidant content greater than that which will generate a decarburizing gas mixture which on leaving said converter is reducing to wustite at the temperature of the converter;
  iii. subsequently blowing said molten metal with a decarburizing feed gas having a composition such that it will generate a decarburizing gas mixture which on leaving said converter which is reducing to wustite at the temperature of the converter;
  iv. recovering gas generated in said converter by means of a gas conduit connected to said converter by means of a gas-tight joint which does not permit appreciable ingress of atmospheric air into or egress of gas from said joint but which permits rotation or tilting of said converter without disconnecting said converter from said gas conduit;
  v. directly cooling said gas-tight joint from said converter to said gas conduit by means of a quench stream selected from the group consisting of liquid hydrocarbons, gaseous hydrocarbons, mixtures of hydrocarbons with carbon dioxide and/or water vapour, hydrogen and mixtures thereof;

vi. tapping steel and slag in molten form from said converter; and vii. operating said converter as a closed system in which said blowing with oxidising gas, said blowing with decarburizing feed gas and said charging with iron feedstock, said recovery of gas generated in said converter and said tapping of steel and slag from said converter are effected without opening of said converter to the atmosphere.

* * * * *